(12) United States Patent
Han

(10) Patent No.: US 10,032,356 B1
(45) Date of Patent: Jul. 24, 2018

(54) DISPLAY CARD PROTECTION CIRCUIT MONITORING STRUCTURE

(71) Applicant: EVGA CORPORATION, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 15/641,342

(22) Filed: Jul. 5, 2017

(51) Int. Cl.
*G08B 17/00* (2006.01)
*G08B 21/18* (2006.01)
*G06F 9/4401* (2018.01)
*G06F 1/26* (2006.01)
*G06F 1/20* (2006.01)

(52) U.S. Cl.
CPC ............. *G08B 21/185* (2013.01); *G06F 1/20* (2013.01); *G06F 1/26* (2013.01); *G06F 9/4401* (2013.01)

(58) Field of Classification Search
CPC . G08B 21/185; G06F 1/20; G06F 1/26; G06F 9/4401
USPC .......................................................... 340/584
See application file for complete search history.

(56) References Cited

U.S. PATENT DOCUMENTS

| | | | |
|---|---|---|---|
| 6,717,811 B2* | 4/2004 | Lo | G06F 1/20 361/698 |
| 9,600,040 B1* | 3/2017 | Han | G06F 1/20 |
| 2009/0323286 A1* | 12/2009 | Han | G06F 1/20 361/702 |

* cited by examiner

*Primary Examiner* — Eric M Blount
(74) *Attorney, Agent, or Firm* — Leong C. Lei

(57) ABSTRACT

A display card protection circuit monitoring structure includes: a display card body; at least one protection circuit module, configured on the display card body, and adapted to generate an open-circuit state when the display card body is abnormal; at least one monitoring device, configured on the display card body and in electric connection with the protection circuit module, and adapted to monitor a use state of the protection circuit module; at least one power supply, respectively in electric connection with and supplying power to the protection circuit module and monitoring device; and at least one warning module, in electric connection with the monitoring device, and driven by the monitoring device to issue warning when the open-circuit state happens. Whereby, the protection circuit module is used to prevent the abnormality or damage of the display card body, and the motoring device can drive the warning module to issue warning.

7 Claims, 5 Drawing Sheets

DISPLAY CARD PROTECTION CIRCUIT MONITORING STRUCTURE

(a) TECHNICAL FIELD OF THE INVENTION

The present invention relates to a display card protection circuit monitoring structure, and more particularly to a display card protection circuit monitoring structure using fuse principle and real-time monitoring warning to prevent a display card from damage and remind users of the maintenance or replacement thereof so as to provide the display card with double protection.

(b) DESCRIPTION OF THE PRIOR ART

In the structures of data processing systems, the so-called basic input-output system (BIOS), the first guard of the whole system, is a first program executed after a data processing system is booted; if unable to finish the BIOS program, usually some hardware may have a problem.

After the data processing system power-on, the power-on self-test part, the BIOS test sequences generally are: the tests of a dynamic random access memory (DRAM), The BIOS device itself, a display (VGA) card, and then other peripherals. However, if an error occurs before the display card is tested or the card itself is in error, it cannot be known in advance what parts have failed or have a device error such that it still have to spend time to do one-by-one detection, causing users to be embarrassed and increasing the maintenance time for maintenance personnel.

Especially, when the display card is abnormal, the abnormality is very difficult to be excluded because the problem status cannot be viewed from a monitor. Even if display cards are highly developed recently and some models of display cards have been installed with a self-test system, allowing users to check ordinarily and actively the condition of a display card so as to have routine and preventive precautions. However, the failure of a display card happens in the event of a sudden situation, still returning to the above problems.

Therefore, The above display card self-test systems has the following problems and defects upon use; they only provide routine and preventive precautions, incapable of the handling of sudden accident, and still needing the error detection of BIOS, such kind of practice of the remedy is a main cause that maintenance cannot be shortened.

SUMMARY OF THE INVENTION

To overcome the defects mentioned above, to prevent a display card from damage and remind a user of maintenance or replacement by means of fuse principle and real-time monitoring warning, and to provide a display card with double protection, the present invention is proposed.

The main object of the present invention is to provide a display card protection circuit monitoring structure, warning immediately that a display card body is abnormal to remind a user of maintenance or replacement.

Another object of the present invention is to provide a display card protection circuit monitoring structure, using fuse principle and real-time monitoring warning to carry out double protection to the display card body.

To achieve the objects mentioned above, the present invention proposes a display card protection circuit monitoring structure, including: a display card body; at least one protection circuit module, configured on the display card body, and adapted to generate an open-circuit state when the display card body is abnormal; at least one monitoring device, configured on the display card body and in electric connection with the protection circuit module, and adapted to monitor a use state of the protection circuit module; at least one power supply, respectively in electric connection with and supplying power to the protection circuit module and monitoring device; and at least one warning module, in electric connection with the monitoring device, and driven by the monitoring device to issue warning when the open-circuit state happens. Whereby, the protection circuit module is adapted to provide basic precautions, for example, prevention from overheat or large current when a user is using the display card body. In addition, the monitoring module is used to monitor the protection circuit module; it drives the warning module immediately to issue warning to inform a user of the abnormality of the display card body when the display card body is abnormal to result in the protection circuit module generating an open-circuit state.

DETAILED DESCRIPTION OF THE PREFERRED EMBODIMENTS

Figure 1:
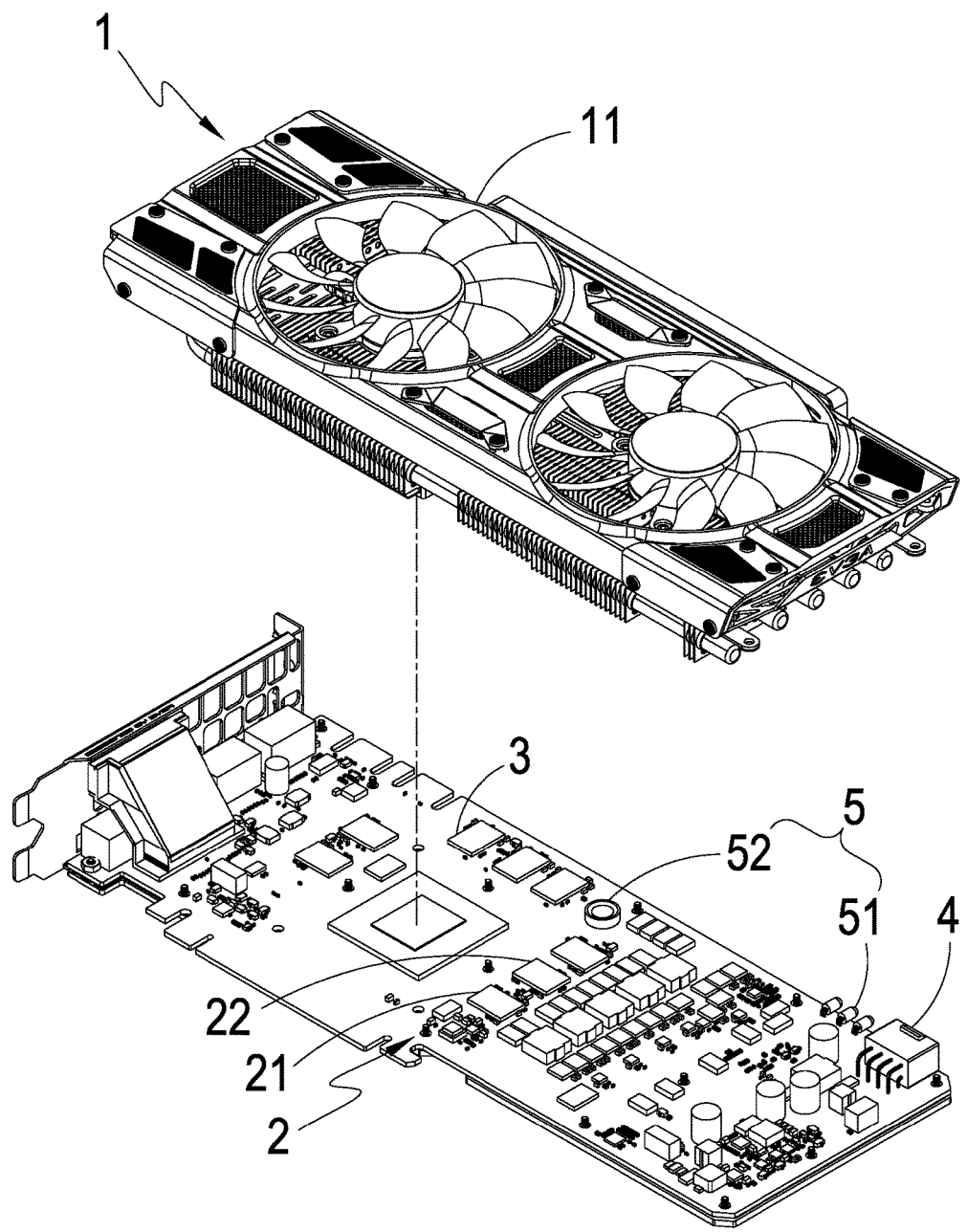
FIG. 1 is an exploded view of a structure of a preferred embodiment according to the present invention.
Figure 2:
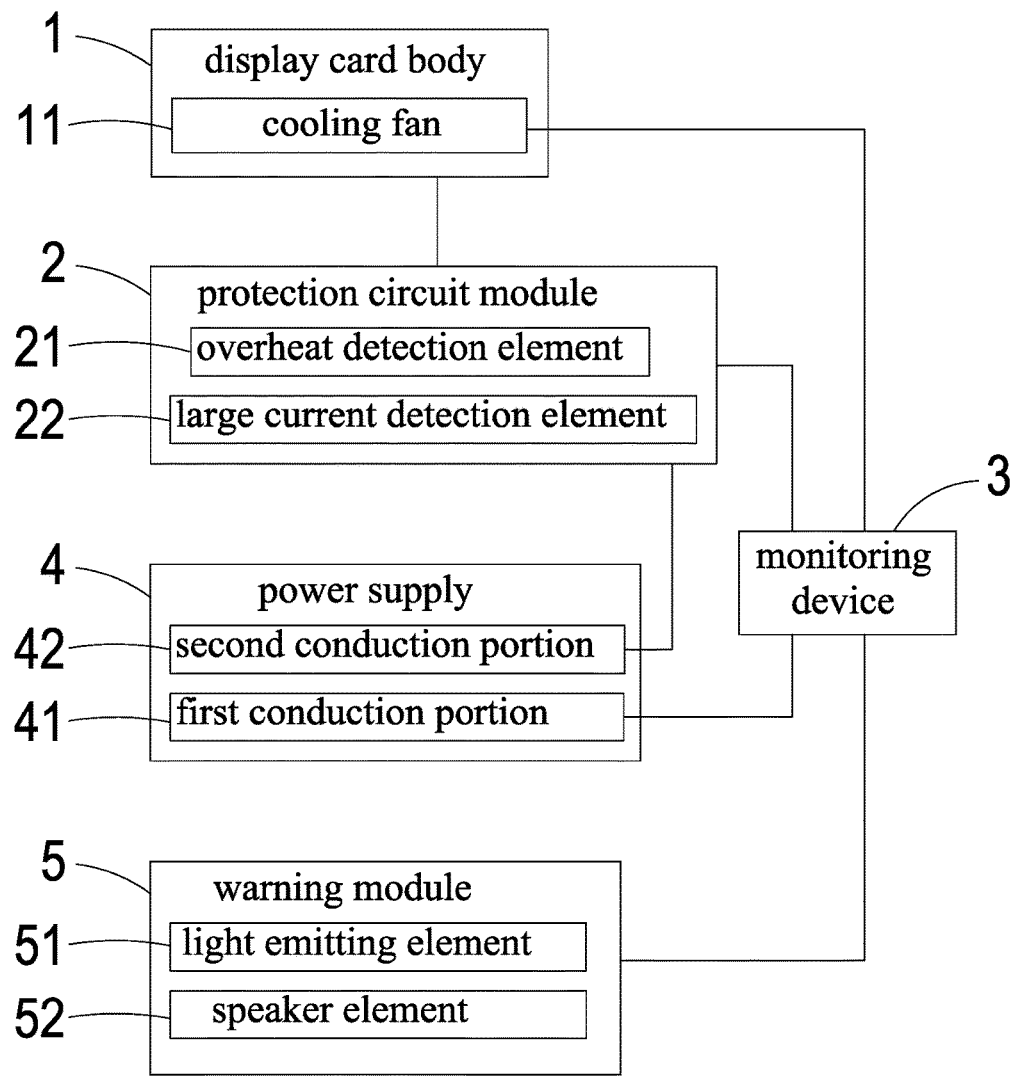
FIG. 2 is a structural block diagram of the embodiment of the present invention.
Figure 3:
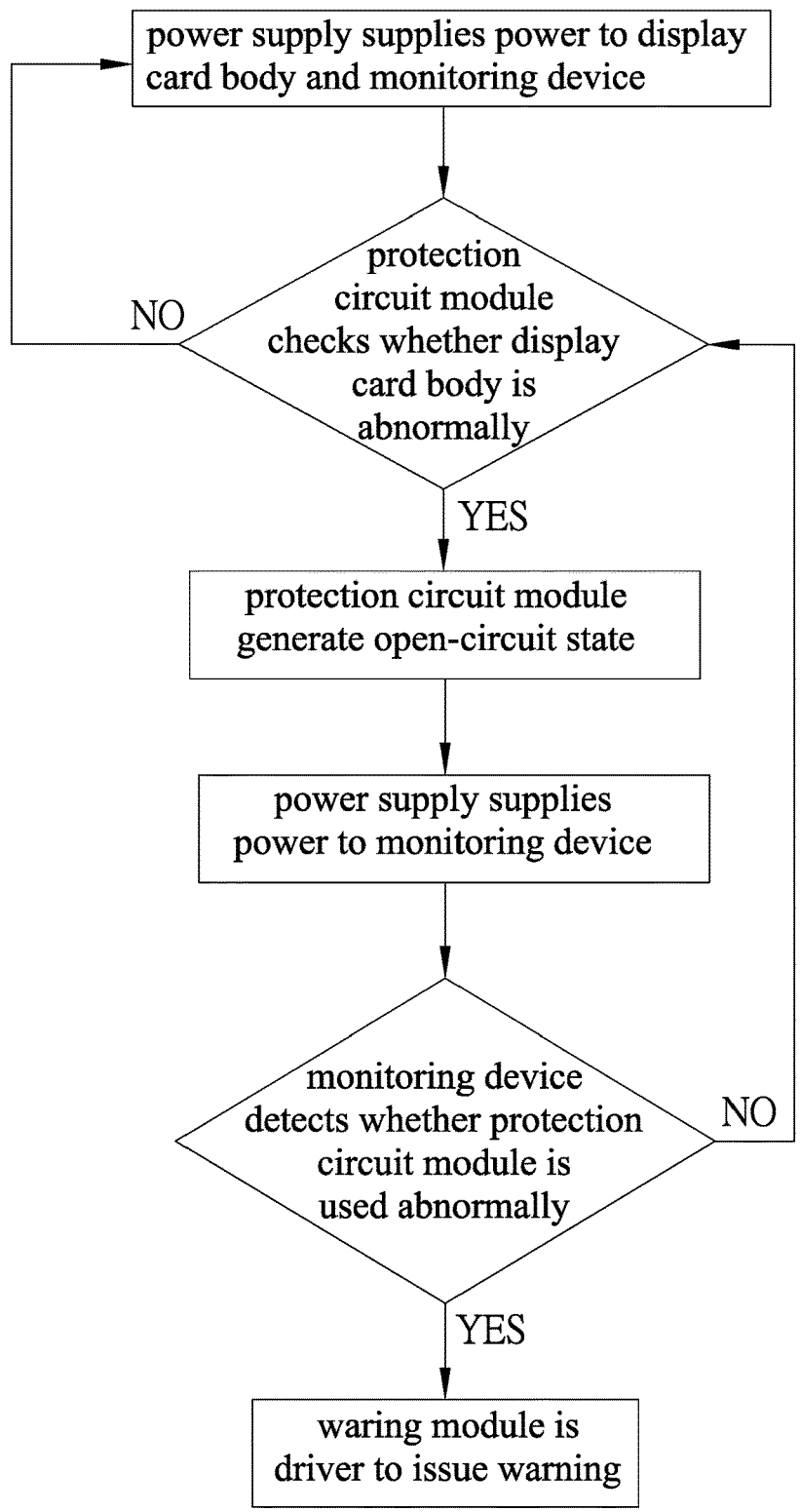
FIG. 3 is a flow chart of the embodiment of the present invention.
Figure 4:
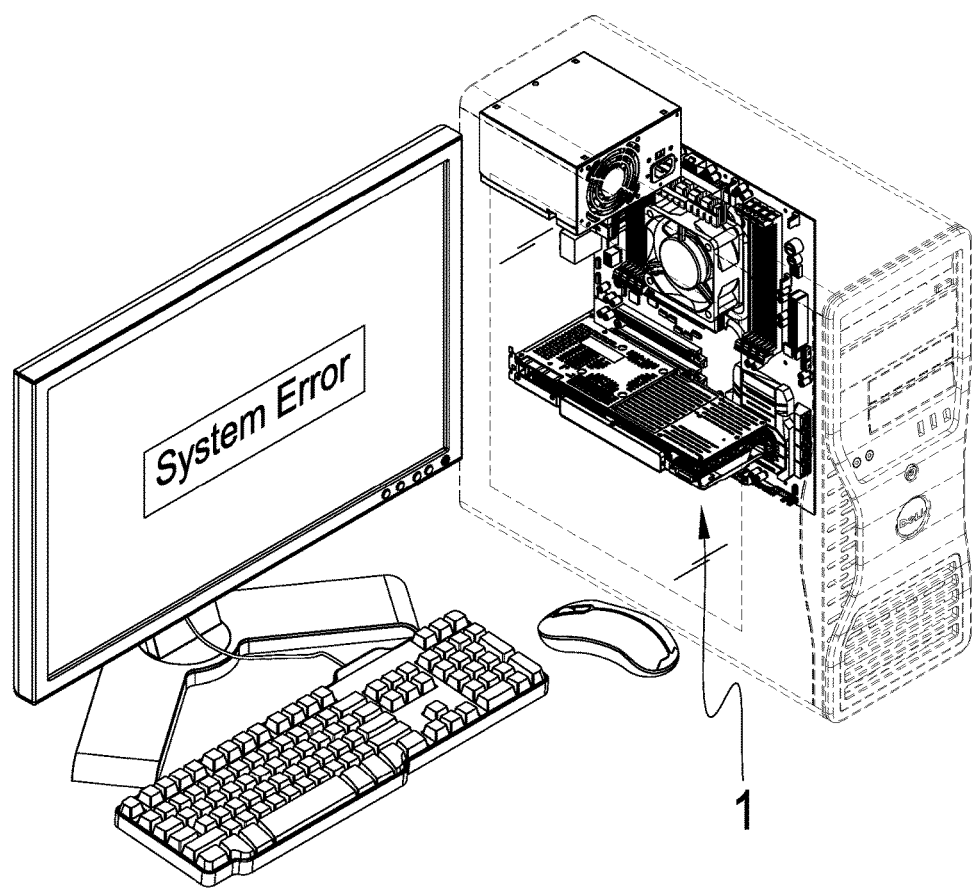
FIGS. 4 and 5 respectively show the embodiment of the present invention upon implementation.
Figure 5:
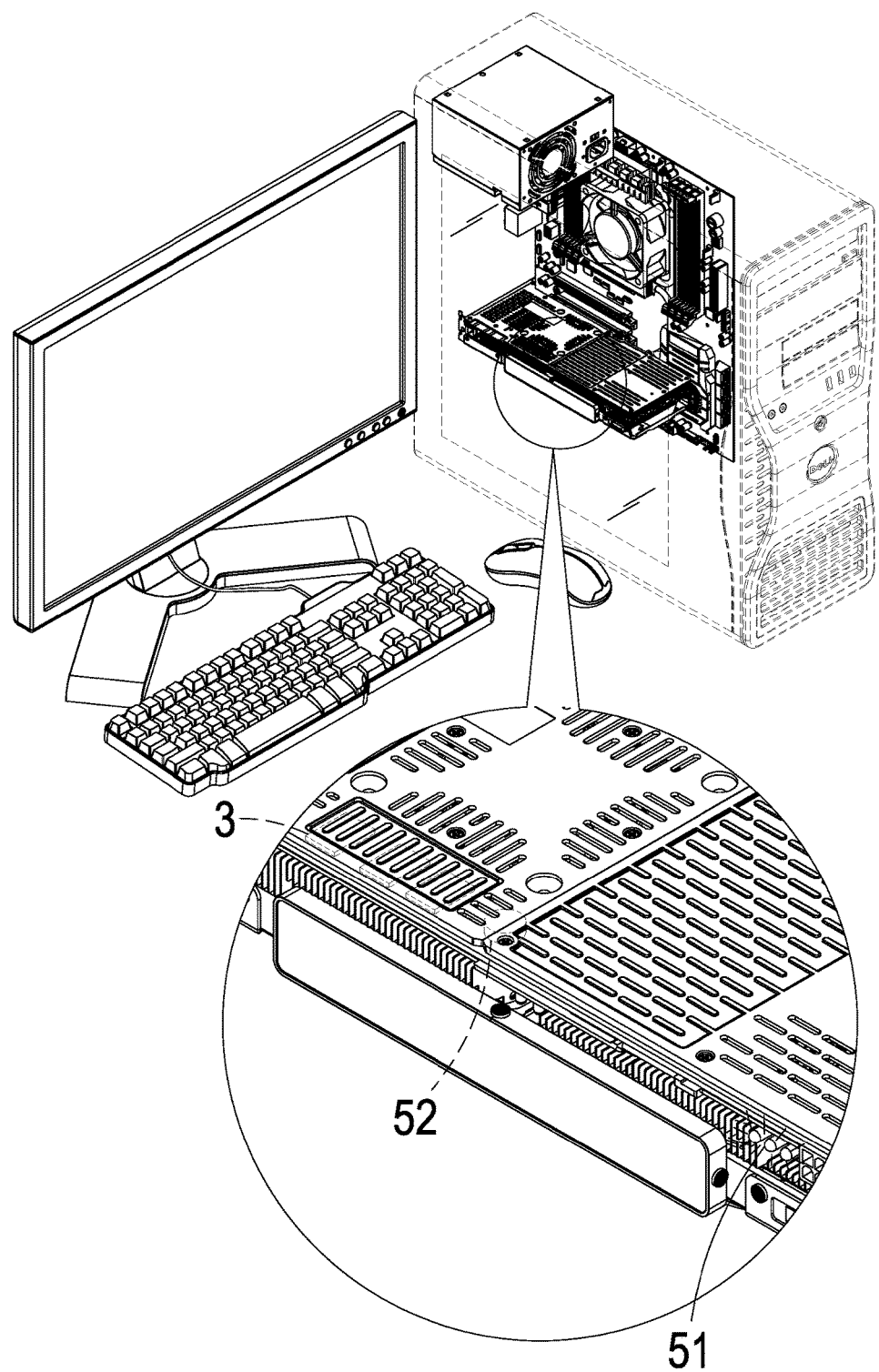

Referring to FIGS. 1 and 2, a display card protection circuit monitoring structure of the present invention includes: a display card body 1, having at least one cooling fan 11; at least one protection circuit module 2, configured on the display card body 1, and adapted to generate an open-circuit state when the display card body 1 is abnormal, the protection circuit module 2 including an overheat detection element 21 and large current detection element 22; at least one monitoring device 3, configured on the display card body 1 and in electric connection with the protection circuit module 2, adapted to monitor the use state of the protection circuit module 2 and capable of monitoring directly the running action of the cooling fan 11; at least one power supply 4, respectively in electric connection with and supplying power to the protection circuit module 2 and monitoring device 3, and including a first conduction portion 41, and a second conduction portion 42 in parallel connection with the first conduction 41; and at least one warning module 5, in electric connection with the motoring device 3, and driven by the monitoring device 3 to issue a warning when the open-circuit state happens, the warning module including at least one light emitting element 51 and speaker element 52.

According to the corresponding combination of the components mentioned above, fuse principle and real-time monitoring warning can be further used to prevent a display card from damage and remind a user of maintenance or replacement so as to provide the advantages of the double protection for the display card; the detailed explanation will be given thereinafter.

Referring to FIGS. 1 to 5, the main structures of the present invention are all configured on the display card body 1; taking this embodiment as an example, the main structures have the protection circuit module 2, monitoring device 3, warning module 5, and etc, and the power supply 4 respectively supplies power to the protection circuit module 2 and monitoring device 3 through the first conduction portion 41 and second conductive portion 42 so that the monitoring device 3 and warning module 5 can provide a second stage of protection and warning function for the display card body 1 when the display card body 1 is abnormal.

Specifically, the protection circuit module 3 offers every kind of basic protection function when the display card body 1 is generally used, including using the overheat detection element 21 to detect the operation temperature of the display card body 1; the protection circuit module 3 reminds a user that the display card body 1 will soon be overloaded if the temperature exceeded, and it judges that the abnormality happens if the temperature has been over the load and then generates an open-circuit state to force the display card body 1 to stop operation temporarily. Similarly, if the large current detection element 22 is used for detection, the protection circuit module 2 judges that it is abnormal, and the open-circuit state can be used in the same way to stop the power supply to the display card body 1.

At this time, because the power supply 4 respectively supplies power dependently to the protection circuit module 2 and monitoring device 3 in a parallel connection way, the monitoring device 3 can still be normally operated even if the display card body 1 is powered down, and drives the warning module 5 to issue warning to inform a user, for example, allowing the power supply 4 to supply power to the light emitting element 51 of the display card body 1 to display the error states of the display card body 1 with different light signals according to different abnormal conditions so as to facilitate a user's quick judgment on what kind of abnormal condition the display card body 1 is in when a user detach the housing accommodating the display card body 1. In addition, the speaker element 4 can be used to issue a warning sound to remind the user to open the housing to check the abnormality, thereby shorten the abnormality exclusion time of the display card body 1.

In addition, the monitoring of the monitoring device 3 is simply according to whether the protection circuit module 2 or cooling fan 11 is normally powered, for example, the protection circuit module 2 is caused to generate an open-circuit state when the display card body 1 is abnormal, and at this time, the partial pressure detection signal of the monitoring device 3 is changed from High (12 Volts) to Low (0 Volt). In addition, detecting the turning speed of the cooling fan 11 is used to judge an abnormal state if the turning speed is different from a set speed.

The present invention has the following advantages over the prior arts:
1. warning immediately the abnormality of the display card body so as to remind a user of maintenance or replacement;
2. using fuse principle and real-time monitoring warning to carry out double protection to the display card body 1; and
3. supplying the protection circuit module 2 and monitoring device 3 with dependent power to ensure protection.

I claim:

1. A display card protection circuit monitoring structure, comprising:
   a display card body;
   at least one protection circuit module, configured on said display card body, and adapted to generate an open-circuit state when said display card body is abnormal;
   at least one monitoring device, configured on said display card body and in electric connection with said protection circuit module, and adapted to monitor a use state of said protection circuit module;
   at least one power supply, respectively in electric connection with and supplying power to said protection circuit module and monitoring device; and
   at least one warning module, in electric connection with said monitoring device, and driven by said monitoring device to issue warning when said open-circuit state happens.

2. The structure according to claim 1, wherein said protection circuit module comprises an overheat detection element.

3. The structure according to claim 1, wherein said protection circuit module comprises a large current detection element.

4. The structure according to claim 1, wherein said power supply comprises a first conduction portion and a second conduction portion in parallel connection with said first conduction portion.

5. The structure according to claim 1, wherein said warning module comprises at least one light emitting element.

6. The structure according to claim 1, wherein said warning module comprises a speaker device.

7. The structure according to claim 1, wherein said display card body has at least one cooling fan, and said monitoring device monitors directly the running action of said cooling fan.

* * * * *